United States Patent Office 3,460,960
Patented Aug. 12, 1969

3,460,960
COATED GLASS AND METHOD OF
MAKING SAME
Josef Francel, Robert F. Jagodzinski, and Fred E. Mansur, Toledo, Ohio, assignors to Owens-Illinois Inc., a corporation of Ohio
Filed May 3, 1965, Ser. No. 452,857
Int. Cl. B29d 11/00; C03c 17/22; B44d 1/20
U.S. Cl. 117—33.3                                                                 12 Claims

ABSTRACT OF THE DISCLOSURE

A fluid coating composition essentially composed of salts of iron and copper selected from the group of salts consisting of acetates, chlorides, citrates, nitrates, oxalates and mixtures thereof dispersed in a dissipable fluid carrier such as water and/or alcohol in a concentration of from about 1.5 to 100 grams per milliliter of fluid carrier and in a weight ratio of iron salts to copper salts ranging from about 0.02 to 20.0 is possessive of such characteristics that the coating composition may be heatset or hardened on a glass surface at temperatures ordinarily ranging from about 275° F. to 600° F. to produce a resultant coated glass object having a rigid, adherent, film-like protective layer thereon ranging from about 0.1 to 1.0 micron in thickness which in addition to being more lubricious and providing greater scratch resistance than the same glass surface in an uncoated condition, provides the surface of the glass object with a coating possessing selective light transmission characteristics which at the following indicated light wavelengths are within the listed percentage ranges of light transmission, to-wit:

Figure 1:
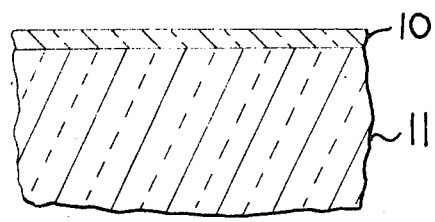

| Wavelength (millimicrons) | Range of light transmittance (percent) |
|---|---|
| 400 | 1.53–7.0 |
| 450 | 3.5–16.0 |
| 500 | 7.0–27.0 |
| 550 | 14.0–42.0 |
| 600 | 23.0–54.0 |
| 650 | 31.0–62.0 |
| 700 | 40.0–66.0 |

The present invention relates generally to a coating system. More particularly, the present invention relates to a method of coating a vitreous substrate. Even more particularly, the present invention envisions a method of coating which, when carried out in a manner specified in more detail hereinafter, imparts to an otherwise clear and/or transparent glass substrate the light transmittance characteristics of an amber glass, and even darker.

Amber glass is widely used for a variety of applications ranging from reflectors to insulators to containers. In the latter application, the amber glass, in addition to possessing the general properties of glass which may it desirable as a receptacle for a host of items ranging from food, medicines, pharmaceuticals and other like substances to electronic components, additionally possesses the inherent property of screening out appreciable percentages of light waves in the visibile spectrum, e.g., 400 to 700 millimicrons. As a consequence, products contained or stored in receptacles formed of amber glass are possessed of increased "shelf life" in that the strength, potency, purity or original compostion is not as subject to attack, deterioration or other change by light degradation as would otherwise occur if the substance involved were packaged in a receptacle formed of conventional transparent bottle glass. Thus, amber glass serves as a light shield in the glass container art protecting the contents of the container from any adverse effects as might accompany prolonged exposure to light waves of a wave length ranging, for example, up to 700 millimicrons.

A number of amber glass formulations are known, of course. Generally, the amber color is obtained by including, in a glass batch composition, carbon and sulfur or a precursor of carbon and sulfur in particular amounts calculated to yield the shade of amber desired.

Amber glass is usually produced by the glass manufacturer in a separate melting furnace which necessitates all the attendant auxiliary equipment which adds to expense. Additionally, a full range of glass properties is usually not available since the formulation must include substances which impart the amber coloration and which are inconsistent with the obtaining of certain properties.

It is a general object of the present invention to provide a coating method which is capable of converting substantially any glass substrate, usually substantially transparent, into an amber colored article having light transmittance characteristics approximating and even lower than those of amber glass.

It is still another object of the present invention to provide a method of coating a glass container to yield a simulated amber glass which accordingly obviates the necessity of separate amber glass, batch-melting and auxiliary manufacturing apparatus and related equipment.

It is yet another object of the present invention to provide a coating method which may be carried out in a very facile manner.

It is another object of the present invention to provide a coating method which can be carried out at a temperature range well below the annealing or softening temperature of the range of conventional glass.

It is yet another object of the present invention to provide a coating method for glass substrates which, in addition to yielding an amber coating, provides a sheath of protection, as it were, against physical contact, e.g., abrasion or scratching, as encountered from foreign objects or from self abrasion of glass articles in automatic handling apparatus, e.g., filling lines, packing apparatus, etc.

It is still another object of the present invention to provide a method of coating a glass container which coating is possessed of increased lubricity which is very useful to the packer who packages his product in the container utilizing mass production apparatus and techniques. Thus, glass containers coated in accordance with the present invention are very ideally suited for use, since the coated bottles are in effect less subject to breakage than uncoated bottles whereby speed of production may be increased without usually attendant risk.

It is a particular object of the present invention to provide a substrate bearing an integral coating of metal salts, which coating is stable, durable and of product-protecting amber coloration.

It is also an object of the present invention to permit production of glass containers of a wider spectrum of properties, but still possessing light transmittance characteristics of an amber glass or darker.

It is collaterally an object of the present invention to provide such containers in such manner that the light transmissibility can be achieved in tailor-made fashion by simple control of the formulation of the applied coating.

It is still another object of the present invention to provide a method of producing amber coloration in glass, which method can be incorporated into conventional and existing glass production systems such as glass container manufacturing and the like.

Figure 2:
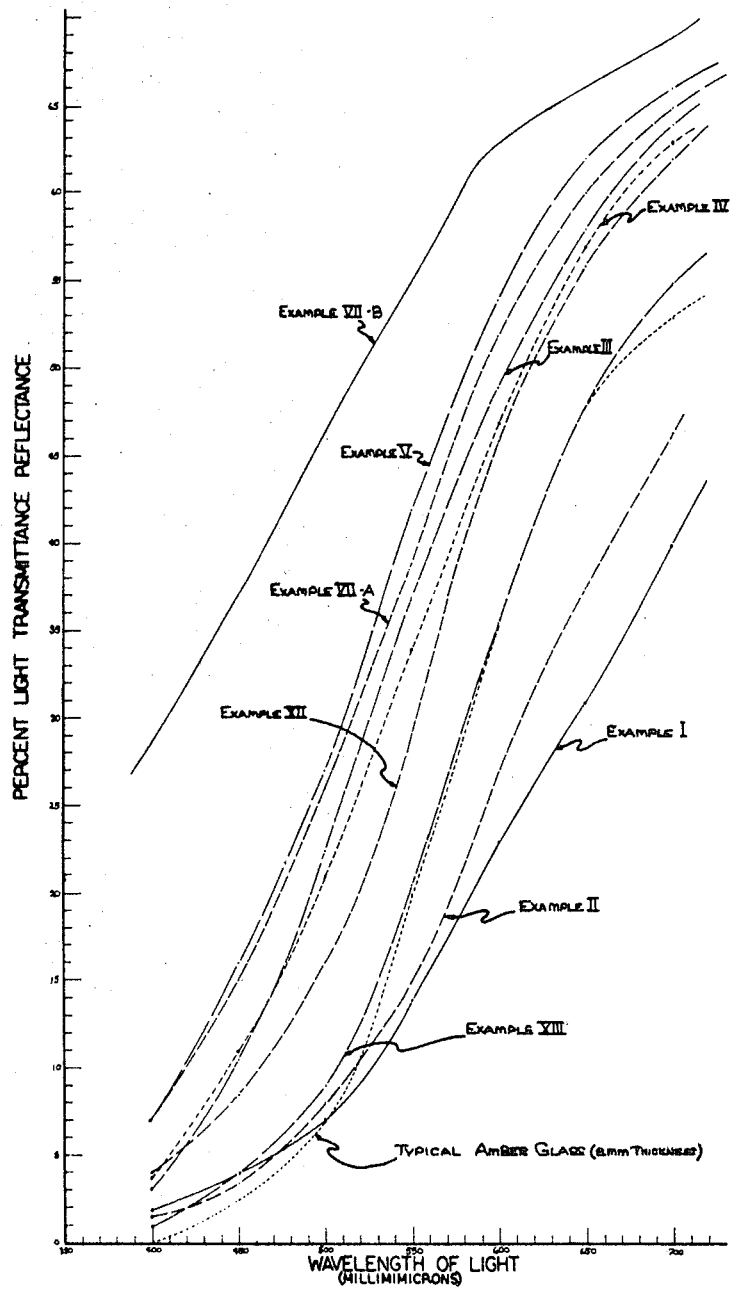
Figure 3:
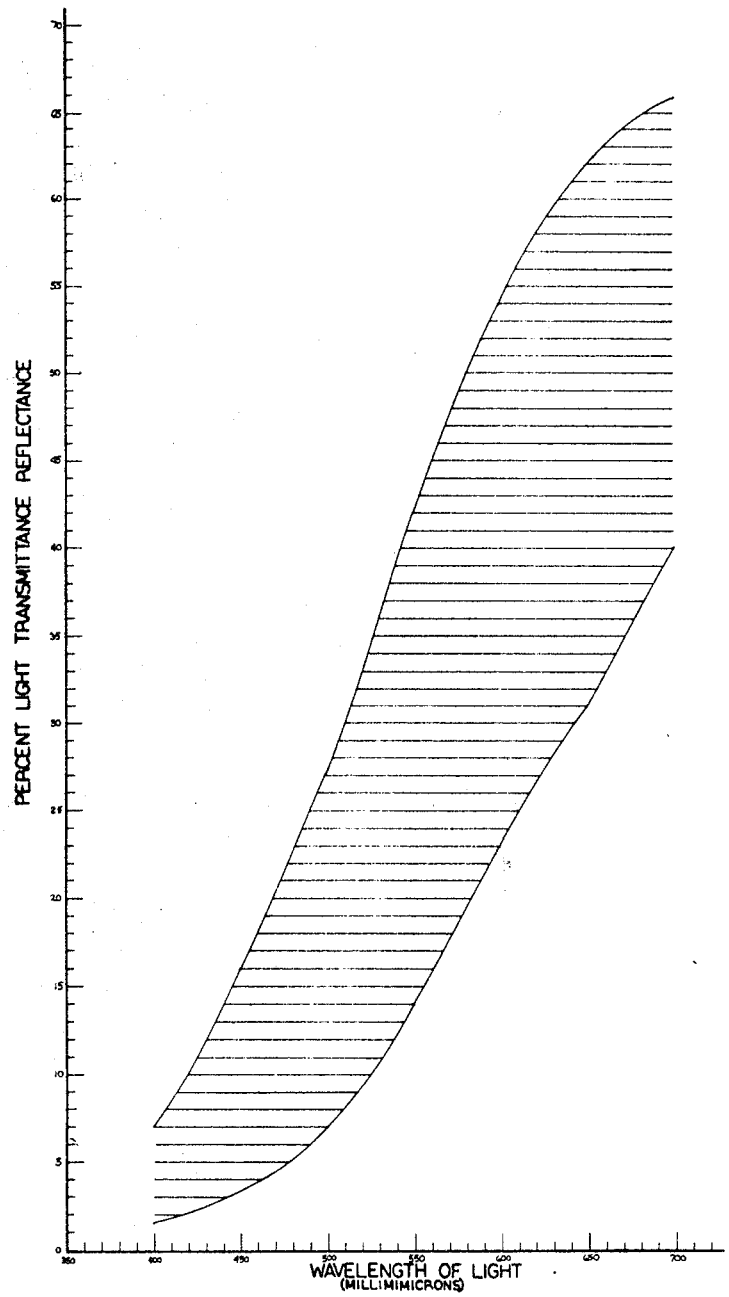

The foregoing objects, as well as many others, will become readily apparent to those skilled in the art from the following detailed description and recitation of various preferred examples illustrating several variant embodiments of the method, the coating composition, and the product, or article, of the present invention and considered in conjunction with the annexed drawings, wherein:

FIG. 1 depicts a fragmentary, cross-sectional representation of a coated glass object or substrate prepared in accordance with the present invention; and FIG. 2 is a comparative graphic representation of the light transmission and reflectance characteristics of various coated glass substrates including, among others, coated glass substrates prepared in accordance with the present invention; and FIG. 3 is a consolidated graphic representation of the ranges of the light transmission and reflectance characteristics of coated glass substrates of the present invention.

One important advantage which the present invention provides is the ability to formulate a glass having any desired physical properties, having in mind the end use and without regard to coloration, since the ultimate container can be coated in accordance with the method of the present invention to yield, as generally depicted in FIG. 1, a light-screening, amber coating 10 on a glass substrate 11, such as a glass container. Prior to the present invention it was not economically feasible to formulate amber glasses to any desired physical property.

Generally, amber glasses are made in a few general types. On the other hand, the more conventional glasses being in wider utility are manufactured with a wide range of properties. By the present invention, this whole range of glasses are now available for utilization in diverse fields and they can be relatively simply converted into amber glasses, as it were, or at least into coated containers having the light transmittance properties of amber glass.

Stated most simply, the present invention envisions a method of treating a vitreous surface which comprises applying to the vitreous surface, while the latter is at a temperature of from about 275° F. to about 600° F., a fluid substance inclusive of an iron salt and a copper salt; said salts being selected from the group consisting of acetates, chlorides, citrates, nitrates, oxalates and mixtures thereof, whereby the metal salts are transformed into a firmly attached continuous coating which reduces light transmissibility.

A typical amber glass compositional analysis appears below:

| Constituents: | Weight percent |
|---|---|
| $SiO_2$ | 71.7 |
| $B_2O_3$ | 9.3 |
| $Al_2O_3$ | 5.3 |
| $Na_2O$ | 6.4 |
| $K_2O$ | .6 |
| CaO | .9 |
| BaO | 2.1 |
| $Fe_2O_3$ | .55 |
| FeO | .3 |
| $TiO_2$ | 2.75 |
| $Cl_2$ | .1 |

An amber glass of the foregoing formulation, when formed into a flat glass side one millimeter in thickness, will possess the following light transmittance characteristics as determined by spectrophotometric analysis using, for example, a Carey Model 14 spectrophotometer:

| Wavelength (millimicrons): | Light transmittance (percent) |
|---|---|
| 400 | 7.0 |
| 450 | 14.0 |
| 500 | 26.0 |
| 550 | 37.0 |
| 600 | 57.0 |
| 650 | 65.0 |
| 700 | 70.0 |

A two millimeter thickness slide of the same amber glass will yield the following light transmittance values:

| Wavelength (millimicrons): | Light transmittance (percent) |
|---|---|
| 400 | 0 |
| 450 | 2.5 |
| 500 | 7.0 |
| 550 | 20.0 |
| 600 | 35.5 |
| 650 | 48.0 |
| 700 | 53.0 |

In order to achieve a good amber coloration in the applied coating, the coating should desirably constitute a solution of both an iron salt and a copper salt. Salts of iron and copper which fall within the previously enumerated grouping are the following: iron acetate, iron chloride, iron citrate, iron nitrate, iron oxalate, copper acetate, copper chloride, copper citrate, copper nitrate, copper oxalate and mixtures thereof. The fluid containing the two salts may, in general, be any fluid substance capable of dissolving the salts concerned. Water is a particularly preferred solvent for making up the salt solution by reason of its ready availability but, more importantly, because it, in fact has been found to yield the optimum in regard to coatings of the desired reduced light transmissibility. It is suspected that this may be due to the increased solubility of copper nitrate in water. Of the two salts, copper nitrate is most effective in reducing light transmittance.

Other solvents, such as the organic solvents, are generally usable so long as they are capable of dissolving the salts; albeit not necessarily completely, but at least significantly. Such solvents include the alcohols, the simple esters, ketones, acetates, ethers, etc. Of the organic solvents, the simple alcohols are preferred, although they are not as effective as water as a solvent in forming a solution. Organic solvents, of course, of utility should form a solution of the salts which are relatively fluid, e.g., having a viscosity approximating that of water, although a viscosity approaching that of milk and slightly more viscous is acceptable. A salt solution having a viscosity approaching that of molasses would not, under normal circumstances, be as desirable as the more fluid solutions.

Once the iron and copper salts have been completely dissolved in the solvent in the desired amount, the solution is applied to the substrate, preferably by spraying, although dipping and other conventional methods of application, e.g., roller coating, squeegee, etc., may be utilized.

In accordance with the present invention, the iron and copper salts should be present in a particular amount per given amount of solvent in order that the maximum of benefit in terms of reduced light transmissibility and in terms of amber coloration is achieved. With respect to the iron salt, an amount constituting at least 1.0 gram per 100 milliliters of solvent is necessary. The copper salt should contemporaneously be present in an amount ranging from 0.5 gram to 50 grams per 100 milliliters of the same solution. Most desirably, as indicated, iron and copper salts should both be present in the solution and, most desirably, in a weight ratio of iron salt to copper salt ranging from about 0.02 to about 20. This ratio will embrace a fairly broad spectrum of amber coatings of variant light transmissibility characteristics. A ratio of iron salt to copper salt ranging from about 0.6 to about 12.0 will give a more defined range of light transmittance characteristics in the amber glass range. Most particularly, the iron salt and copper salt should be present in the solution in a weight ratio ranging from about 3.0 to about 12.0.

As indicated previously, any of the known formulated glasses may be treated, e.g., coated, in accordance with the present invention. Generally, exposure to a temperature of from 600° F. to 1200° F. for a sufficient time to achieve a surface temperature in the range of about 275° F. to about 600° F. will induce sufficient sensible heat in the article or substrate to be coated, whereupon spray application of a solution of the iron and copper salts will effect formation of a continuous film having the amber coloration.

The method of the present invention can be incorporated into almost any glass manufacturing operation. Usually, the method would be practiced intermediate formation of the glass body and annealing. The glass body after formation would possess a considerable amount of sensible heat; in fact, an overabundance in most cases. Accordingly, it is desirable in such cases to actually cool the glass body to a degree that the surface temperature falls substantially within the range of about 275° F. to about 600° F. Thereafter, the solution of iron and copper salts is applied, preferably by spraying. Finally, the solution-bearing coating is annealed in the usual annealing lehr as customarily practiced, whereupon the combination of the sensible heat in the glass body and the heat involved in the annealing will cooperate to develop the amber coloration, as described hereinabove and in more detail hereinafter.

A solution of copper nitrate and iron nitrate wherein the iron nitrate is present in the range 6 to 24 grams and the copper nitrate is present in the range 2 to 10 grams, all in the same 100 milliliters of solvent, represents a preferred solution coating for application to a glass substrate since such a coating is ideally yieldative of an integral continuous film coating having an amber coloration very closely simulating that of actual amber glass and possessing light transmittance characteristics at least as low as amber glass. A careful proportioning of the copper salt and the iron salt results in an amber coloration having light transmittance characteristics even lower than amber glass. Thus, an iron nitrate/copper nitrate weight ratio ranging from 0.6 to 12.0 represents the optimum in terms of relative proportions.

The range of temperatures mentioned hereinabove, even for the broad spectrum of glass compositions, is quite safe since the critical softening or annealing temperature of the various glasses is avoided when the post-treatment method is used.

One advantage residing in the use of water as a solvent for the iron and copper salts resides in the fact that lower temperatures are needed. Thus, a surface temperature for a glass article ranging from about 275° F. to about 375° F. is adequate for maturing or heat setting of the coating into an integrally attached, continuous film-like coating having the light transmittance characteristics enumerated hereinabove and in more detail hereinafter. The organic solvents require a somewhat higher temperature. For example, alcohol solutions of the mixture of iron and copper salts should be applied to the glass when the surface temperature ranges from about 450° F. to about 600° F. It, of course, must be appreciated that the temperature ranges, enumerated with respect to the alcohol solvent solution of the salts of iron and copper and the aqueous solution of iron and copper salts, are average values and can be influenced by the size of of the article concerned. Thus, it will be appreciated that a relatively tiny ampoule may require temperatures at the high end of the ranges given and perhaps slightly in excess thereof, since the mass of the glass involved in a tiny ampoule is not sufficient to store any appreciable amount of sensible heat. On the other hand, a relatively large article as, for example, a one or two gallon jug of appreciable wall thickness, may require a temperature at the low end of the temperature ranges enumerated, since a larger amount of heat will have been absorbed, as it were.

By way of illustration, it has been determined that for a 100 milliliter glass bottle, having a wall thickness of about 2 millimeters, exposure to a temperature of 800° F. for about 1½ minutes or to a temperature of 1000° F. for 1 minute will yield a surface temperature within the range enumerated for the aqueous salt solution. Having in mind the same size bottle and envisioning an alcohol solvent solution of the iron and copper salts, a preheat temperature of 1150° F. for about 1 minute or 1050° F. for 1.5 minutes will yield a surface temperature in the range of 450° F. to 600° F. as mentioned as preferred for alcohol solutions.

As indicated hereinbefore, the aqueous solutions are preferred since they tend to produce a slightly darker color and therefore a lower light transmittance whereby the coated article, container, bottle, ampoule, or the like, possesses more inherent protectiveness in terms of shielding the product contained therein from light.

An environmental temperature between about 600° F. to about 1200° F. and a residence time depending on the size of the article to be coated defines a workable temperature range suitable for the satisfactory practice of the method of this invention. Temperatures above 1200° F. are just not required and, since such temperature approaches the softening temperature of some glasses, they are preferably avoided.

The heating step as described hereinabove is preferably carried out first in the practice of the present invention, although not absolutely essential to the development of an amber coating on the glass. Thus, application of a solution of the desired salts followed by a rapid heating, as accomplished, for example, by induction heating, will yield a satisfactory coating. Better results are obtained, however, where the surface to be coated is already at the elevated temperature when the coating is sprayed on, since durability, integrity and continuity of film appear to be superior, as well as uniformity of color.

About the only limitation as to the type of glass which may be treated in accordance with the present invention resides in the question of expansivity. Thus, it has been determined that an applied film coating of this invention will not be permanent where the base glass is formed from a batch composition which is yieldative of a glass having a coefficient of expansion greater than $120 \times 10^{-7}$ cm. per cm./° C. (0–300° C.).

Of the grouping enumerated hereinabove as suitable iron and copper salts, e.g., acetates, chlorides, citrates, nitrates, oxalates and mixtures thereof, a preferred combination envisions a mixture of iron and copper salts wherein both are salts of the same acid, e.g., both chlorides, both acetates, etc. A mixture of iron nitrate and copper nitrate is most preferred in terms of development of a coating which is integral, durable and of low light transmittance. It has been found that neither the sulphates or phosphates of iron and/or copper and mixtures thereof are workable in the method of the present invention, since no amber coloration results. Exactly why the select grouping of salts is workable, while the sulphates and phosphates are not, is not known.

The solution coatings, when applied by spray-application techniques, as described herein, are found to yield films generally ranging in thickness from about 0.10 micron to about 1.0 micron. Even with this thin a coating, the coloration of the film approximates the amber coloration of amber glass and darker.

The following Examples I to V will illustrate preferred formulations of salt solutions in accordance with the present invention, while Examples VI to XII illustrate physical properties of the coatings.

EXAMPLE I 40 grams of ferric nitrate $Fe(NO_3)_3$ and 50 grams of copper nitrate $Cu(NO_3)_2$ and 2 grams of silver nitrate were dissolved in 100 milliliters of water.

EXAMPLE II 40 grams of ferric nitrate $Fe(NO_3)_3$ and 25 grams of copper nitrate and 2 grams of silver nitrate were dissolved in 100 milliliters of water.

EXAMPLE III 40 grams of ferric nitrate and 10 grams of copper nitrate were dissolved in 100 milliliters of water.

EXAMPLE IV 40 grams of ferric nitrate and 10 grams of copper nitrate and 1 gram of silver nitrate were dissolved in 100 milliliters of water.

EXAMPLE V 12 grams of ferric nitrate and 3 grams of copper nitrate were dissolved in 100 milliliters of water.

EXAMPLE VI

In a series of experiments, each of the foregoing solutions were respectively spray-applied to individual transparent glass slides formed of a glass having the following composition:

| | Percent |
|---|---|
| $SiO_2$ | 80.6 |
| $B_2O_3$ | 13.0 |
| $Al_2O_3$ | 2.2 |
| $Na_2O$ | 4.1 |
| CaO } | |
| MgO } | 0.05 |
| $Fe_2O_3$ } | |
| $ZrO_2$ } | |
| $Li_2O$ } | 0.05 |
| $K_2O$ } | |
| $TiO_2$ } | |
| | 100.00 |

The slide in each case was first heated to a surface temperature of 325° F. Each of the solution coatings were sprayed onto each of the slides using a Model No. 5772-SS spray gun manufactured by the Spraying Systems Company of Chicago, Ill. Exposure of each glass slide, which had been previously heated as indicated, to the spray solution for matter of 4–6 seconds at 50 pounds air pressure, was sufficient to effect a uniform deposition of the coating. Sensible heat in each glass slide matured the applied solution into an integral, continuous film having an amber coloration. Each of the slides had an average glass plate measurement of 1.7 millimeters thickness and each was examined and individual light transmittance readings taken for various wavelengths of light on a Carey Model 14 spectrophotometer. Readings are summarized in Table 1, wherein the individual light transmittance readings appear in columns identified by the preceding example numbers.

TABLE 1-A.—PERCENT LIGHT TRANSMITTANCE REFLECTANCE

| Wavelength, millimicrons: | Range for Examples I to V |
|---|---|
| 400 | 1.53–7.0 |
| 450 | 3.5–16.0 |
| 500 | 7.0–27.0 |
| 550 | 14.0–42.0 |
| 600 | 23.0–54.0 |
| 650 | 31.0–62.0 |
| 700 | 40.0–66.0 |

Similar results to those achieved above are obtained when the same solutions are sprayed onto slides having a soda-lime glass composition. As a matter of fact, most any vitreous substrate, including alumina silicate glasses, opal glasses, glass ceramics, etc., is capable of having an amber coloration imparted thereto in the manner described in the examples. About the only limitation involved would be the capability of the glass substrate to endure the heating cycle involved and the expansion limitation noted previously herein.

EXAMPLE VII

To illustrate the necessity of utilizing copper nitrate, there was prepared two solutions A and B. Solution A was composed of 12 grams of ferric nitrate and 3 grams of copper nitrate in 100 milliliters of water. Solution B was composed of 12 grams of ferric nitrate in 100 milliliters of water. Solutions A and B were individually sprayed on separate samples of a glass slide in a manner described just above Table 1. They were also heated in the same manner and thereafter light transmissibility data was gathered and is listed in Table 2 below.

TABLE 2.—PERCENT LIGHT TRANSMITTANCE REFLECTANCE

| | Solution A | Solution B |
|---|---|---|
| Wavelength, millimicrons: | | |
| 400 | 7.0 | 27.0 |
| 450 | 15.0 | 37.0 |
| 500 | 26.0 | 46.5 |
| 550 | 39.0 | 55.0 |
| 600 | 52.0 | 62.0 |
| 650 | 60.0 | 66.0 |
| 700 | 65.0 | 69.0 |

Examination of the data in Table 2 which is graphically depicted in FIG. 2 as Example VII, shows that the glass slide coated with Solution B had a light transmittance reflectance value of 27% at 400 millimicrons wave length, whereas the slide coated with Solution A having copper nitrate in it, in addition to ferric nitrate, had by comparison a percent transmission of 7%. Lower transmission values for slides bearing the coating of Solution A are also evident at the other levels, ranging from 450 to 700 millimicrons.

The following examples will demonstrate the physical properties of the coatings in accordance with this invention.

TABLE 1.—PERCENT LIGHT TRANSMITTANCE REFLECTANCE

| Wavelength, millimicrons | Example I | Example II | Example III | Example IV | Example V |
|---|---|---|---|---|---|
| 400 | 1.94 | 1.53 | 3.0 | 3.69 | 7.0 |
| 450 | 4.0 | 3.5 | 10.5 | 11.0 | 16.0 |
| 500 | 7.0 | 8.0 | 22.5 | 21.0 | 27.0 |
| 550 | 14.0 | 16.0 | 37.0 | 34.0 | 42.0 |
| 600 | 23.0 | 27.0 | 49.0 | 47.0 | 54.0 |
| 650 | 31.0 | 37.5 | 58.0 | 57.0 | 62.0 |
| 700 | 40.0 | 46.5 | 64.0 | 63.0 | 66.0 |

The above "Percent Light Transmittance Reflections" determinations for the indicated wavelength values of each of the respective examples is graphically depicted in FIG. 2, wherein it will be observed that a family of substantially similar curves is established. The region of the graph traversed by such family of curves is depicted by the region intermediate the curves shown in FIG. 3 and corresponds to the range of transmissibility values for the examples, in Table 1 above, and compiled in Table 1-A following:

EXAMPLE VIII

A number of glass slides formed of a borosilicate glass and having a thickness of 2.5 millimeters were heated to a temperature of 325° F. and thereafter sprayed with a coating according to Solution A of the previous Example VII. Thereafter, the slides were subjected to a metal-glass scratch resistance test utilizing a Gardner scratch testing device. This consists, in part, of a rod having a blunt carbide point about the size of a pencil point that can be loaded with various weights. The blunt carbide point is placed on the glass article and the substrate is moved in a straight line perpendicular to the carbide point. The weight required to rupture the coating gives the reading. The coated slide required a loading of 100 grams in order to rupture the coating. In contrast, an uncoated microscope slide evidenced a significant scratch at a loading of 50 grams.

EXAMPLE IX

A number of bottles coated with Solution A in the manner as described were subjected to a glass scratch comparison test. In this test two coated bottles are placed in a machine so that the surfaces of the bottles are in contact. A load is applied directly above the contact point and the machine is rotated slowly in a lateral motion. The weight required to rupture the coating is the ultimate value recorded. Uncoated bottles evidenced a definite scratch in this test at 2 pounds, whereas the bottles coated with Solution A endured 4–5 pound loadings before any scratch was observed.

EXAMPLE X

Bottle specimens prepared in a manner similar to those of Example IX were subjected to a lubricity test wherein two coated bottles are disposed horizontally on a bed having a flat upper surface. A third coated bottle is placed horizontally on top of the two bottles and in contact with one surface of each bottle. The bed is then slowly elevated at one end to develop an elevation. When the angle is steep enough, the upper bottle will slide a given distance. The angle of elevation of the surface is then measured and is a value which reflects the lubricity of that sample angle. In a similar test, the surfaces are first coated with water. In the lubricity test performed dry, it was determined that, with untreated bottles, an angle of 40° was necessary to cause the bottles to move the given distance, whereas with the amber coating of Solution A an elevation angle of 20° caused movement of the specified distance. Wet values were respectively 42° for the untreated, e.g., uncoated glass bottle, while 33° was the angle for the amber coated bottle coated with Solution A in the manner as described.

EXAMPLE XI

In another test, a number of bottles treated with Solution A were tested in accordance with the ASTMB-W Autoclave Test, which consists of heating the coated bottle for one hour in a steam atmosphere at 120° C. All bottles tested passed the test without evidencing any rupture or degradation of coating.

EXAMPLE XII

A glass slide identical to that prepared in Example VI, bearing the solution coating of Example V, was subjected to an annealing cycle of 45 minutes' duration during which the temperature approached the annealing point for this glass, e.g., 1050° F., for about 10–15 minutes. Thereafter, the slide was cooled and examined with a Cary spectrophotometer. The readings appear below in Table 3, together with the data on transmittance taken from Table 1 in Example VI and specifically the data for the slide coated with the coating of Example V.

TABLE 3.—PERCENT LIGHT TRANSMITTANCE REFLECTANCE

| Wavelength, millimicrons: | Example XII | Example V |
|---|---|---|
| 400 | 4.0 | 7.0 |
| 450 | 8.5 | 16.0 |
| 500 | 16.0 | 27.0 |
| 550 | 29.0 | 42.0 |
| 600 | 46.0 | 54.0 |
| 650 | 56.0 | 62.0 |
| 700 | 62.0 | 66.0 |

The comparison readily reveals that a post annealing will effect development of an even darker coloration and corresponding diminution of light transmittance.

EXAMPLE XIII

A solution prepared according to Example V was spray-applied to a glass slide in the same manner described in Example VI. Thereafter, the same heating and spray-on procedure was repeated twice more. Thereafter, examination of the cooled slide, using a Carey Model 14 spectrophotometer, yielded the light transmittance characteristics graphically depicted as Example XIII in FIG. 2 and listed in Table 4 below.

TABLE 4.—PERCENT LIGHT TRANSMITTANCE REFLECTANCE

| Wavelength, millimicrons: | Example XIII |
|---|---|
| 400 | 1.0 |
| 450 | 3.0 |
| 500 | 9.0 |
| 550 | 20.5 |
| 600 | 35.5 |
| 650 | 48.0 |
| 700 | 55.0 |

The foregoing description has dealt largely with the treatment of containers and up to the present time this represents the largest potential. It is envisioned, however, that architectural applications exist for flat glass panels treated in accordance with the present invention. Thus, operating rooms, hospital rooms, convalescent wards, or the like, can easily be fitted with treated glass panes in order that patients or convalescents, having an affliction or injury, etc., otherwise harmed by visible light (or that in the range 300–700 millimicrons), could be safely located therein.

Various decorative effects involving different color intensity can also be more readily achieved than formerly, since coloration intensity can be controlled so easily by control of any one or a combination of the following: temperature, time, selection of salt, amount of salt, relative proportion of salts, application technique, etc.

While the foregoing disclosure sets forth various preferred embodiments, formulations and techniques in the form of a description, it will be appreciated that various other obvious equivalents will be suggested thereby to those skilled in the art.

We claim:
1. The method of forming a hard film-like adherent coating on the surface of a glass body comprising the steps of:
heat setting a thin layer of a heat settable fluid coating composition on said surface by exposing said heat settable fluid coating composition to a temperature of from 275° F. to 600° F., said heat settable fluid coating composition consisting essentially of salts of iron and copper selected from at least one of the group of salts composed of acetates, chlorides, citrates, nitrates and oxalates and dispersed in a heat dissipable fluid carrier in a concentration ranging from about 1.5 to 100 grams per 100 milliliters of fluid carrier and in a relative weight ratio of iron salts to copper salts ranging from 0.02 to 20.0, said heat dissipable fluid carrier being a fluid which will vaporize when subjected to a temperature of from 275° F. to 600° F., whereby said fluid coating composition hardens to an adherent film-like coating of iron and copper salts on said glass body surface.

2. The method as defined in claim 1, wherein the concentration of iron salts in said fluid coating composition ranges from about 1 gram to 50 grams per 100 milliliters of said heat dissipable fluid carrier and wherein the concentration of copper salts in said fluid coating composition ranges from about 0.5 gram to 50 grams per 100 milliliters of said heat dissipable fluid carrier.

3. The method as defined in claim 2, wherein the relative weight ratio of iron salt/copper salt ranges from about 3.0 to about 12.0.

4. The method as defined in claim 3, wherein the concentration of the copper salt is in the range of from about 2 to 4 grams per 100 milliliters of heat dissipable fluid carrier.

5. In a surface coated glass object having a surface coating rigidly adhered thereto and imparting selective light transmission characteristics to said glass object, the improvement wherein said coating is an amber colored glass adherent film-like layer consisting essentially of iron and copper salts present together in a weight ratio of iron salts to copper salts ranging from about 0.02 to about 20.0, and wherein said salts of iron and copper are salts selected from at least one of the group consisting of acetates, chlorides, citrates, nitrates and oxalates.

6. In a surface coated glass object, as defined in claim 5, wherein said salts of iron and copper are selected from the same one of said group of salts.

7. In a surface coated glass object, as defined in claim 5, wherein said film-like layer of iron and copper salts ranges from about 0.1 to 1.0 micron in thickness.

8. In a surface coated glass object, as defined in claim 5, wherein the glass upon which said coating is adhered is essentially transparent and wherein said coating selectively controls the light transmission characteristics thereof within a selected percentage range for given wavelengths of light, as follows:

| Wavelength (millimicrons): | Range of light transmittance (percent) |
| --- | --- |
| 400 | 1.53–7.0 |
| 450 | 3.5–16.0 |
| 500 | 7.0–27.0 |
| 550 | 14.0–42.0 |
| 600 | 23.0–54.0 |
| 650 | 31.0–62.0 |
| 700 | 40.0–66.0 |

9. The method of substantially simulating the ultra-violet light absorbing characteristics of amber colored glass by providing an integrally bonded coating having ultra-violet light-absorbing characteristics on the surface of a transparent, glass object comprising the steps of:

hardening to a thickness ranging from 0.1 to 1.0 micron on the surface of said glass object an essentially continuous layer of a fluid coating composition by exposing said fluid coating composition to a temperature of from 275° F. to 600° F., said fluid coating composition consisting essentially of salts of iron and copper selected from at least one of the group of salts composed of acetates, chlorides, citrates, nitrates and oxalates and dispersed in a heat vaporizable fluid carrier in a concentration ranging from 1.5 grams to 100 grams per 100 milliliters of fluid carrier and in a relative weight ratio of iron salts to copper salts ranging from 0.6 to about 12.0;

thereby forming an integrally bonded coating on said surface controlling the percentage of light transmission through said glass object for various wavelengths of light to within the following ranges:

| Wavelength (millimicrons): | Range of light transmittance (percent) |
| --- | --- |
| 400 | 1.53–7.0 |
| 450 | 3.5–16.0 |
| 500 | 7.0–27.0 |
| 550 | 14.0–42.0 |
| 600 | 23.0–54.0 |
| 650 | 31.0–62.0 |
| 700 | 40.0–66.0 |

10. The method as defined in claim 9, wherein said heat vaporizable fluid carrier is selected from at least one of the group consisting of water and alcohol.

11. The method as defined in claim 9, wherein the salts of iron and copper are selected primarily from the same one of said group of salts.

12. The method as defined in claim 9, wherein the iron salt and the copper salt are both nitrates.

References Cited

UNITED STATES PATENTS

| | | | |
| --- | --- | --- | --- |
| 2,639,999 | 5/1953 | McLean | 117—33.3 X |
| 2,662,035 | 12/1953 | Levi | 117—169 X |
| 3,258,521 | 6/1966 | Francel et al. | 117—33.3 X |
| 3,309,218 | 3/1967 | Brader et al. | 117—33.3 |

WILLIAM D. MARTIN, Primary Examiner

U.S. Cl. X.R.

117—54, 94, 124, 169; 252—300

PO-1050
(5/69)

UNITED STATES PATENT OFFICE
CERTIFICATE OF CORRECTION

Patent No. 3,460,960          Dated August 12, 1969

Inventor(s) J. Francel, et al.

It is certified that error appears in the above-identified patent and that said Letters Patent are hereby corrected as shown below:

Column 1, line 59 "may" should be --make--. Column 7, line 65 "Reflections" should be --Reflectance--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents